UNITED STATES PATENT OFFICE.

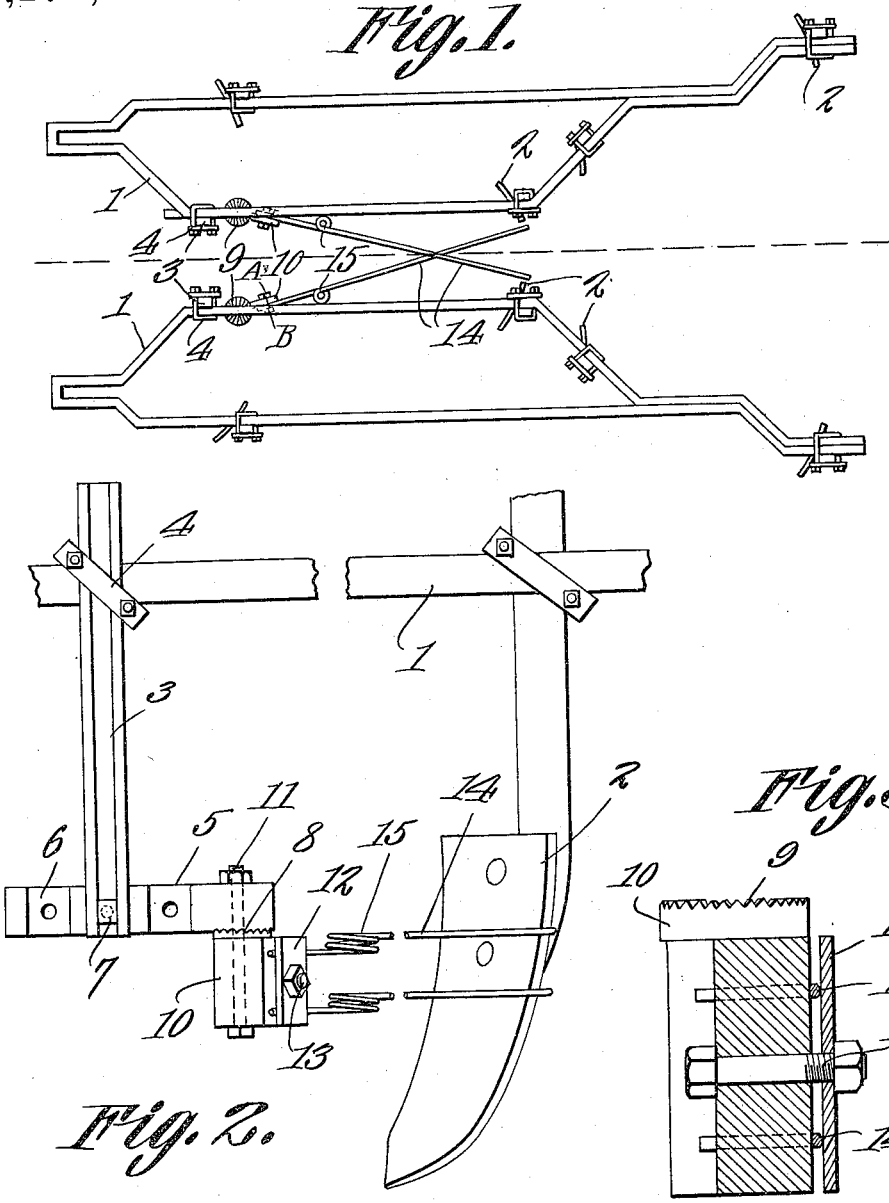

LEO B. FARLEY, OF GLADWIN, MICHIGAN.

WEEDER ATTACHMENT FOR CULTIVATORS.

1,174,838.  Specification of Letters Patent.  Patented Mar. 7, 1916.

Application filed April 6, 1915. Serial No. 19,519.

*To all whom it may concern:*

Be it known that I, LEO B. FARLEY, a citizen of the United States, residing at Gladwin, in the county of Gladwin and State of Michigan, have invented a new and useful Weeder Attachment for Cultivators, of which the following is a specification.

This invention relates to weeding attachments for cultivators, the same being especially designed for use in connection with sulky corn cultivators.

One of the objects of the invention is to provide yieldable fingers designed to extend across the rows of corn and to flip or wipe past the standing corn, the fingers being sufficiently stiff to cause any weeds to bend down onto the ground where they will be covered by the soil thrown against the row by the shovels of the cultivator.

Another object is to provide an attachment of this form which can be adjusted readily to meet varying conditions.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—Figure 1 is a plan view of a portion of a cultivator having the present improvements combined therewith. Fig. 2 is an enlarged side elevation thereof. Fig. 3 is an enlarged section on line A—B Fig. 1.

Referring to the figures by characters of reference 1 designates the sections of a cultivator having shovels 2 of the usual or any preferred form. To these sections and in advance of the shovels are secured hangers 3 adjustable vertically, said hangers being held to the sections by means of clips 4 of any desired form. The lower end of each hanger is connected to an arm 5 having spaced notches 6, any one of which is adapted to receive the lower portion of the hanger, the said hanger being secured to the arm by means of a bolt 7 or the like. The rear portion of the arm 5 is provided with a gripping face 8 made up of radially disposed teeth and this face is adapted to engage corresponding teeth 9 formed upon a block 10, there being a connecting bolt 11 extending through the block 10 and the arm 6 for the purpose of holding the gripping face 8 in engagement with the teeth 9. Thus it will be seen that by loosening bolts 11, block 10 can be adjusted angularly after which by tightening the bolt the parts can be held against relative movement.

A clamping plate 12 is connected to block 10 by a bolt 13 and this plate is adapted to bind the ends of spring fingers 14 against the block 10 so as to hold them against displacement. Each of the fingers preferably includes a coil 15 and the fingers are superposed as shown, preferably two of them being connected to each block 10. However, if desired, this number can be increased or only a single finger can be used on each block.

The fingers connected to the opposed beams 1 of the cultivator converge rearwardly and are so proportioned that when the cultivator is drawn along a row, these laterally and rearwardly extending fingers will extend across the row and will be brought into contact with the standing stalks of corn. As the weeding attachment is only to be used after the second or third cultivation of the corn, the stalks will be sufficiently strong to deflect the spring fingers toward each other so that they will wipe past the stalks. The said fingers, however, will engage the weeds and press them downwardly onto the ground where they will be covered by the loosened soil thrown against the row by the shovels 2.

What is claimed is:—

1. A weeder attachment for cultivators, including a hanger, an arm extending transversely thereof at its lower end and adjustable relative thereto, a block below and pivotally mounted relative to the arm, coöperating serrated faces upon the arm and block, means for holding said faces in engagement to secure the block against movement relative to the arm, superposed fingers adjustably and detachably secured to the block, said fingers being parallel and being resilient throughout their length.

2. The combination with opposed cultivator beams, a hanger depending from each beam, and an arm adjustably connected to the lower portion of each hanger, of a block adjustably connected to each arm, a pair of superposed spring fingers adjustably and detachably connected to each block, the fingers of each pair being parallel and being resilient throughout their length, the fingers of the two pairs being obliquely disposed and crossing each other at points below the space between the beams.

In testimony that I claim the foregoing as my own, I have hereto affixed my signature in the presence of two witnesses.

LEO B. FARLEY.

Witnesses:
EDMUND C. BURKE,
ROBERT B. MARK.